United States Patent
Taffin et al.

(10) Patent No.: US 6,266,603 B1
(45) Date of Patent: Jul. 24, 2001

(54) METHOD FOR DETECTING SLIPPERY SURFACES AND BLOCKED VEHICLE WHEELS, AUTOMATIC TRANSMISSION IMPLEMENTING THE METHOD AND VEHICLE EQUIPPED WITH SAME

(75) Inventors: Christian Taffin, Chatou; Jean-Pierre Arbona, Bures-Morainvilliers, both of (FR)

(73) Assignees: Renault, Boulogne Billancourt; Automobiles Peugeot, Paris; Automobiles Citroen, Neuilly sur Seine, all of (FR)

( * ) Notice: Subject to any disclaimer, the term of this patent is extended or adjusted under 35 U.S.C. 154(b) by 0 days.

(21) Appl. No.: 09/367,964
(22) PCT Filed: Dec. 15, 1998
(86) PCT No.: PCT/FR98/02731
  § 371 Date: Jan. 27, 2000
  § 102(e) Date: Jan. 27, 2000
(87) PCT Pub. No.: WO99/32807
  PCT Pub. Date: Jul. 1, 1999

(30) Foreign Application Priority Data

Dec. 22, 1997 (FR) .................................................. 97 16266

(51) Int. Cl.$^7$ .................................................. B60K 17/00
(52) U.S. Cl. .............................. 701/87; 701/74; 701/71; 701/82; 180/197
(58) Field of Search .................... 701/82, 74, 71, 701/90; 180/197; 28/757

(56) References Cited

U.S. PATENT DOCUMENTS

| | | | |
|---|---|---|---|
| 4,545,240 | * 10/1985 | Leiber | 73/146 |
| 4,691,812 | 9/1987 | Takizawa . | |
| 5,069,302 | * 12/1991 | Kageyama | 180/197 |
| 5,083,631 | * 1/1992 | Nakayama et al. | 180/197 |
| 5,884,719 | * 3/1999 | Schramm et al. | 180/197 |
| 6,023,650 | * 2/2000 | Yamamoto et al. | 701/82 |

FOREIGN PATENT DOCUMENTS

| | | |
|---|---|---|
| 39 27 349 | 2/1990 | (DE) . |
| 42 26 800 | 2/1994 | (DE) . |
| 0 444 772 | 9/1991 | (EP) . |
| 0 503 942 | 9/1992 | (EP) . |
| 0 638 742 | 2/1995 | (EP) . |
| 2 545 567 | 11/1984 | (FR) . |
| 5-223157 | 12/1993 | (JP) . |
| 9-249050 | 1/1998 | (JP) . |

\* cited by examiner

*Primary Examiner*—William A. Cuchlinski, Jr.
*Assistant Examiner*—Olga Hernandez
(74) *Attorney, Agent, or Firm*—Young & Thompson

(57) ABSTRACT

A method for detecting slippery ground in a vehicle with automatic transmission includes detecting the instantaneous running conditions, with the aid of at least one parameter that represents the existence of slippery ground; on the basis of this detection, generating, by counting, a value that represents the change in running conditions as a function of time; comparing the value with reference conditions; as a function of the result of the said comparison, deciding whether or not the instantaneous running conditions correspond to slippery ground.

15 Claims, 2 Drawing Sheets if counter<S1 then slippery_road=1
if counter>S2 then slippery_road=0

METHOD FOR DETECTING SLIPPERY SURFACES AND BLOCKED VEHICLE WHEELS, AUTOMATIC TRANSMISSION IMPLEMENTING THE METHOD AND VEHICLE EQUIPPED WITH SAME

BACKGROUND OF THE INVENTION

The invention relates to automatic transmissions for land vehicles equipped with gearboxes with discrete gear ratios or constantly varying transmission ratios. It relates more specifically to a method for detecting slippery ground on which the driving wheels of a vehicle have a tendency either to spin or to lock up.

DESCRIPTION OF THE INVENTION

A number of methods of controlling automatic transmissions, having a greater or lesser ability to take particular running conditions into consideration, are already known in the state of the art.

Thus, document FR 83/07277 describes a control method intended to eliminate inopportune up-shifting from a ratio N−1 to a higher ratio N in a phase when the driver has lifted off. However, this document does not tackle the problems associated with the spinning or locking of the driving wheels.

Another prior document, EP-A-0,638,742, describes the control of an automatic transmission using variables associated with the load of the vehicle, with the driver's more or less sporty driving style, and with the advisability of a change in gear ratio. These variables are obtained using fuzzy logic, as a function of a number of input parameters including conditions of the spinning of the driving wheels. However, the way in which the wheelspin or wheel lock-up conditions are taken into account, and the detection of the existence of slippery ground, are not described.

Furthermore, in most of the known methods for managing gear changes (continuous or discrete) in automatic mode, the driver has the option of manually selecting, using a switch, a particular driving mode tailored to slippery ground, and generally known as the "winter" or "snow" mode.

SUMMARY OF THE INVENTION

An object of the invention is to assist the driver in the particular situations mentioned previously, so as to guarantee optimum safety and the best possible driving comfort.

To this end, the invention proposes a method comprising steps consisting in:
  detecting the instantaneous running conditions, with the aid of at least one parameter that represents the existence or otherwise of slippery ground;
  on the basis of this detection, generating, by counting, a value that represents the change in running conditions as a function of time;
  comparing the said value with reference conditions;
  as a function of the result of the said comparison, deciding whether or not the instantaneous running conditions correspond to slippery ground,
  characterized in that in order to generate, by counting, a value that represents the change in running conditions as a function of time, a current value is decremented by a first step ($\Delta x\_\Delta B$) each time locking of the driving wheels is detected, the said current value is decremented by a second step ($\Delta x\_\Delta E$) each time the spinning of the driving wheels is detected, and the said current value is incremented by a third step ($\Delta x\_out$) when the wheels are not locked or spinning.

According to other features of the method:
  the said reference conditions with which the value representing the change in running conditions is compared consist of a lower threshold (S1) and an upper threshold (S2), and it is decided that the ground is slippery when the said value becomes higher than the lower threshold (S1), and it is decided that the ground is not slippery when the said value becomes lower than the upper threshold (S2).
  advantageously, the lower threshold (S1) and the upper threshold (S2) are variable over time and are set as a function of the driver's driving style.
  as a preference, the incrementation step ($\Delta x\_out$) is set as a function of the driver's driving style.

The invention makes provision, when slippery ground is detected, for at least one of the following actions to be taken:
  the automatic transmission is switched into a safety operating mode, particularly the so-called "snow" mode to provide drive to the vehicle;
  an indicator alerting the driver to the fact that the safety mode has been adopted is activated;
  the function of down-shifting early under braking is cancelled so as not to down-shift if the wheels are locked.

In order to obtain the intended results, the invention therefore relies firstly on a principle of detecting slippery ground, this principle being based essentially on analysing the gradient of a parameter that represents the speed of the driving wheels. This analysis makes it possible automatically to activate a special mode for managing the transmission ratios, this mode being tailored to low adhesion, and this, on the one hand, provides the driver with greater safety and, on the other hand, affords driving comfort that is optimized with respect to the specific running conditions.

Automatic switching to "snow" mode allows the driver to obtain optimized management of the automatic transmission ratios for the running conditions encountered on slippery ground.

This makes it possible, for example, when pulling way with wheelspin, to be in a transmission ratio which provides the vehicle with drive and which, when the wheels lock up, makes it possible not to engage low ratios at high speed, as this would be ill advised from the safety point of view.

Furthermore, in order to detect a condition in which the driving wheels are locked up, the derivative of a characteristic variable of the rotation of the driving wheels is analysed under braking, and a locking of wheels is detected if the brake is active and if the said derivative is negative and below a threshold (Sb) representative of locking.

Furthermore, to detect the end of a condition of locking, the method according to the invention comprises the following steps:
  (C1): testing whether the brake is released and whether the vehicle speed is below a first threshold (Svv1) and, if these conditions are satisfied, starting a first time delay (T1);
  (C2): testing whether the vehicle speed is above a second threshold (Svv2) or whether the selected transmission ratio is higher than or equal to the current ratio and, if one of these conditions is satisfied, starting a second time delay (T2);
  (C3): testing whether one of the said time delays (T1,T2) has elapsed, whether the automatic transmission is in the P, R or N position, or whether the "kick-down" is activated, and if one of these conditions (C1,C2,C3) is satisfied, detecting the end of a condition in which the driving wheels are locked.

The invention also relates to an automatic transmission employing the above control methods and to a motor vehicle with an automatic gear box with discrete gear ratios equipped with such an automatic transmission.

BRIEF DESCRIPTION OF THE DRAWINGS

The invention will be better understood and other advantages of the invention will become clear from reading the following description given by way of non-limiting example and in the appended drawings, in which.

DESCRIPTION OF THE PREFERRED EMBODIMENTS

Figure 1:
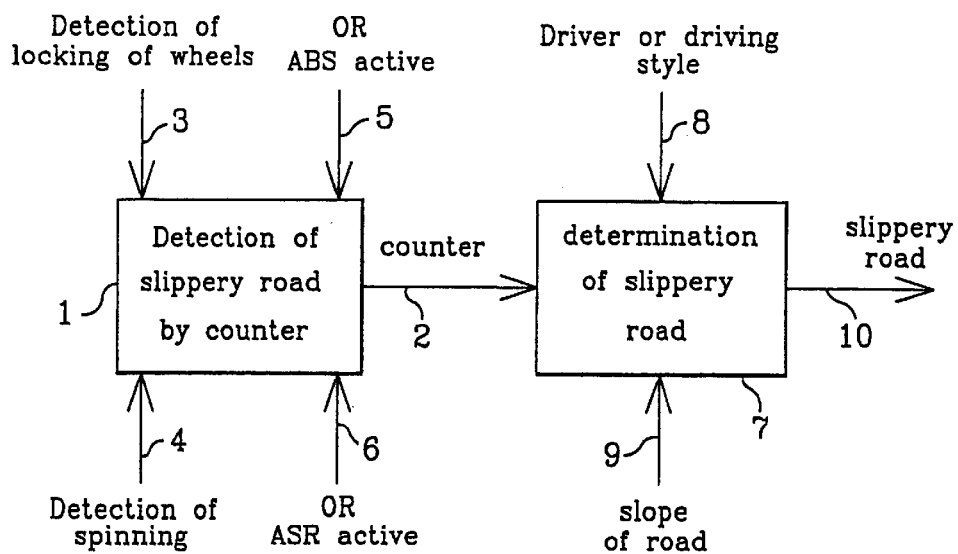
FIG. 1 depicts a block diagram of the steps of the method for detecting slippery road according to the invention, and the input and output parameters used by the method.

Reference is made to FIG. 1. This depicts the method for detecting slippery ground in the form of two interconnected functional blocks depicting the main steps in the detection method. Each functional block receives inputs and generates an output which is sent to the next block, the output of the last block representing the desired information, namely whether or not the road is slippery.

A first functional block 1 corresponds to a first step in the method for detecting slippery ground, which consists in generating a value in a counter, the change and instantaneous state of which quantify the more or less slippery nature of the ground, as will be explained in further detail later.

To construct the output value at 2 on the slippery road recognition counter, use is made, at input 3 to the functional block 1, of an item of information about the detection of the locking of the driving wheels, which information item is available from elsewhere, and, at input 4 to the functional block 1, of an item of information about the detection of the spinning of the driving wheels of the vehicle, which information item is also available from elsewhere and, as is known, for example from a device (ASR) for detecting and regulating wheelspin.

As an alternative, it is possible to use, at 5, in place of the item of information about detection of the locking of the wheels, an "ABS active" information item (if the vehicle has ABS (anti-lock braking system)), and, on the other hand, at 6, in place of the information item about the detection of the spinning of the wheels, an "ASR active" information item (if the vehicle has ASR (anti-spin regulation)).

In a second step of the method for detecting slippery ground, a second functional block 7 determines, as a function of the value at output 2 from the slippery ground recognition counter, whether or not the road is slippery, taking account of external parameters (8,9) supplied to the functional block 7. To this end, to determine whether or not the road is slippery, the instantaneous value of the counter (at 2) is compared with predetermined thresholds S1,S2 as will be explained in conjunction with FIG. 3.

When the result of this comparison indicates that the road is recognized as being slippery, the following actions, separately or in combination, are decided upon in the transmission computer:

a) switching to the so-called "snow" mode for driving comfort and safety. In this mode, only the higher ratios are available for the transmission, which therefore transmits a more moderate torque to the wheels, preventing them from spinning.

b) illuminating the "snow" warning light, if available, which makes it possible to alert the driver to the fact that the road is slippery;

c) cancelling the "early down-shifting under braking" function, if available in the computer, which makes it possible to limit engine braking and therefore the braking torque applied to the wheels, for safety reasons, such as for the reason of avoiding locking.

Figure 2:
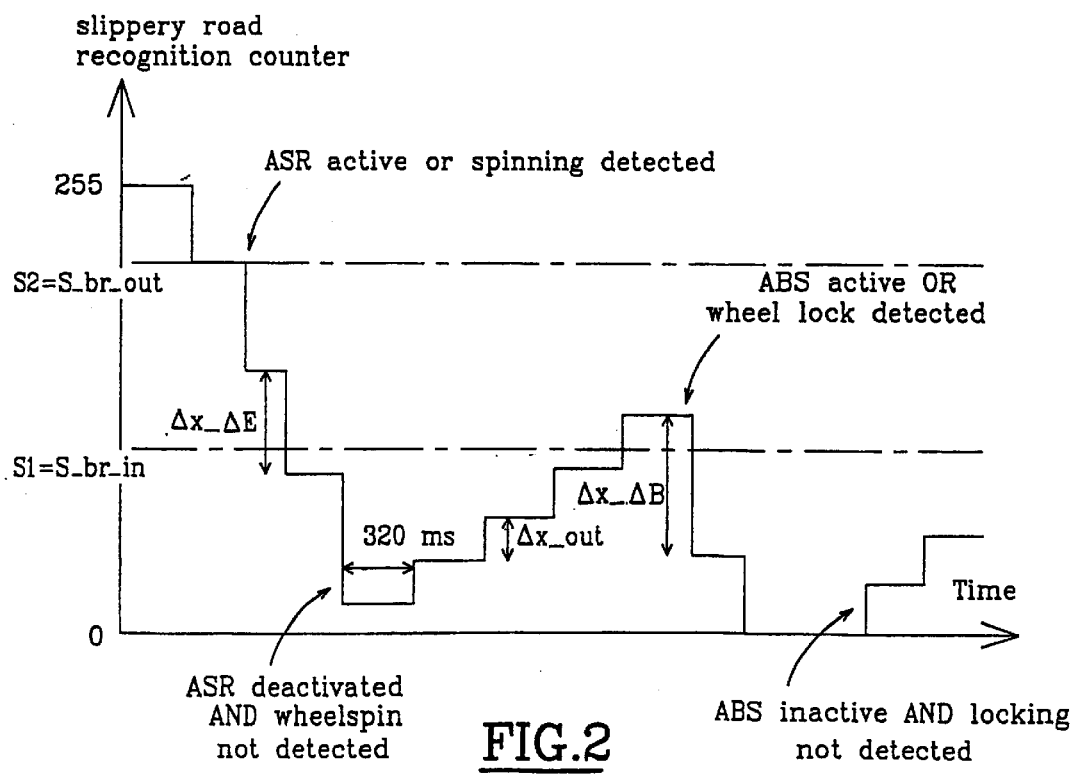
FIG. 2 depicts the principle of recognizing the state of the slippery road by managing a recognition counter which is decremented or incremented according to the running circumstances.

Reference is made to FIG. 2 for a more detailed description of how the output state (at 2) on the recognition counter is obtained and how it is used to determine whether or not the road is slippery.

In this figure, time is plotted along the abscissa and the value of the slippery road recognition counter is plotted on the ordinates, as a function of time. Starting from a given initial value, for example a maximum value of 255, corresponding to the coding over 8 bits of the value of the counter, the instantaneous value of the recognition counter is determined as follows:

when the spinning of the driving wheels is detected at 4 or when the anti-spin regulation ASR at 6 (if available in the vehicle) is in operation, then the slippery road detection counter is decremented by a lump-sum step $\Delta x\_\Delta E$, every 320 ms for example;

when the locking of the driving wheels is detected at 3, or when the anti-lock ABS system at 5 (if present on the vehicle) is in operation, the slippery road recognition counter is decremented by a lump-sum step $\Delta x\_\Delta B$;

when no spinning is detected and the ASR is deactivated, or when no locking is detected and the ABS is deactivated, then the slippery road recognition counter is reincremented with a step denoted $\Delta x\_out$, signifying that the method is coming out of a "slippery road" decision.

It should be noted that the decrements $\Delta x\_\Delta E$ and $\Delta x\_\Delta B$ represent a shift tending towards a "slippery road" decision. Furthermore, the fact of envisaging decrementation steps $\Delta x\_\Delta E$, $\Delta x\_\Delta B$ which are different for wheelspin and for locking, in particular makes it possible to obtain different sensitivity towards detecting a slippery road depending on the situation provoked by the driver (locking or spinning). The values of the $\Delta x\_\Delta E$, $\Delta x\_\Delta B$ and $\Delta x\_out$ steps can easily be chosen by the person skilled in the art, taking account of course of the scale of counter values available, namely 256 values in the example described.

Furthermore, the choice of two different thresholds S1,S2 for the input and output of the slippery road condition, introduces an hysteresis effect which makes it possible to avoid any phenomenon of hunting between two states of the automatic transmission.

Incidentally, it could very well be envisaged for there to be decrementation steps which are also a function of the driver's driving style, for example for a driver who more readily than a calmer driver creates wheelspin and locks his wheels, and for this calmer driver, recognition of a slippery road could be made less sensitive.

Likewise, the incrementation step Δx_out could also depend on the driver's driving style so as not to remain in "snow" mode too long, if the driver is a "sporty" driver. The method for detecting slippery road according to the invention therefore leaves scope for customized adjustments, possibly made adaptively.

Similarly, if a step downwards slope is detected, the risks of the wheels locking are increased and may, in this case, desensitize recognition of a slippery road in favour of detecting the locking of the wheels, which then takes precedence.

Figure 3:
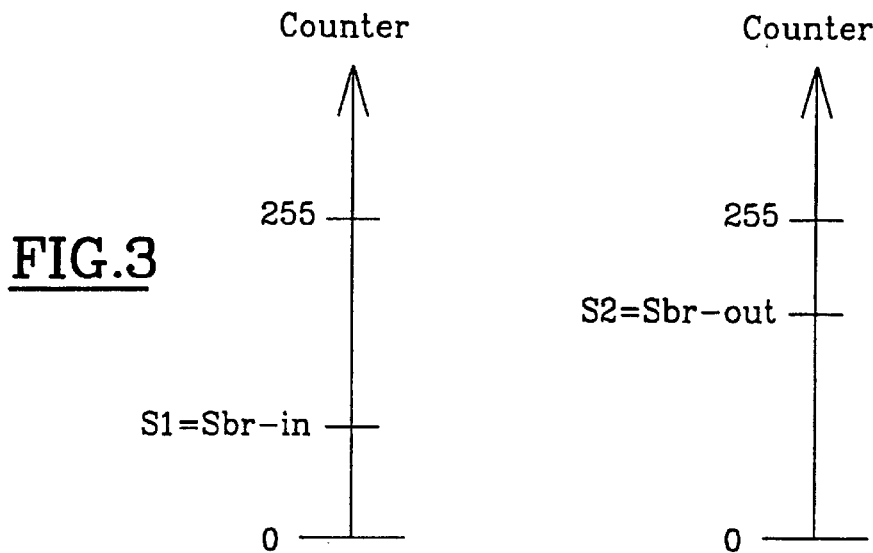
FIG. 3 depicts the principle of detecting the state of the slippery road as a function of the state of the slippery ground recognition counter compared with predetermined thresholds.

Reference is made to FIG. 3 which gives the input and output thresholds in the so-called slippery road state. Thus, when the slippery state recognition counter gradually drops below a first detection threshold denoted S1=Sbr_in, (also depicted in broken lines in FIG. 2), then the road is detected as being slippery, and one of the measures (a,b,c) described above, for example, is taken.

Then, starting out from a low value (below S1) the counter once again becomes higher than a second detection threshold denoted S2=Sbr_out, then the road is detected as no longer being slippery, and the safety measures (a,b,c) taken earlier can be cancelled. The introduction of such a phenomenon of hysteresis between the input at S1 and the output at S2 of the so-called slippery state makes it possible to avoid phenomena of oscillations relating to the detection and makes it possible to manage the input and the output independently in the detection mode in question.

As has been seen, the method for detecting slippery ground according to the invention calls in particular upon a step of detecting the locking of the driving wheels. One embodiment of this method for detecting locking will now be described in conjunction with FIG. 4, it being understood that other methods for detecting the locking of driving wheels may be envisaged without detracting from the generality of the method described above for detecting slippery ground.

In most gear change control strategies in automatic mode, the gear ratios are selected as a function of the vehicle speed and of the load on the engine. In most cases, these criteria are translated into the form of gear change laws, conveniently mapped in a plane Vveh/αth, Vveh denoting the vehicle speed, and ath denoting the throttle angle or, more generally, the angle of opening of the member that regulates the inlet of fuel to the engine.

Figure 4:
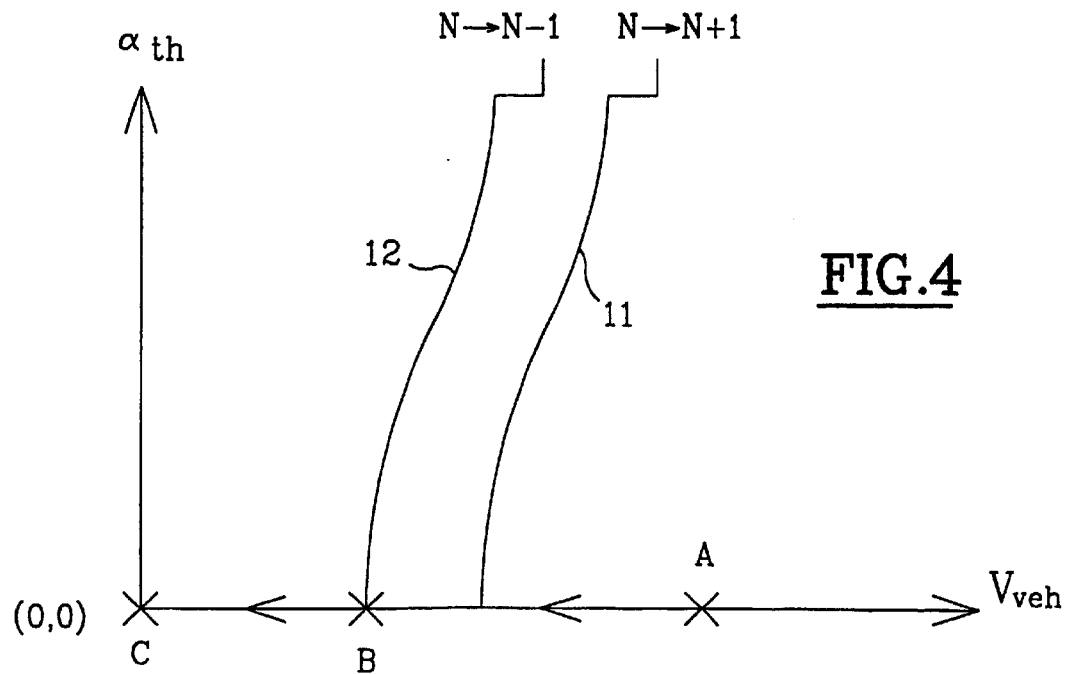
FIG. 4 depicts, in the form of a graph of the throttle valve angle as a function of vehicle speed, a characteristic cycle of the problem of down-shifting through the ratios when the wheels are locked, inherent in the very principle of managing the ratios in automatic transmissions.

Thus, a driver driving along at a certain speed V in gear N will, if he brakes for example on ground with a low adhesion causing the driving wheels to lock, cross the down-shift curve 12 of FIG. 4 at the point B. This will cause down-shifting from a first gear ratio on and so forth until the wheels are completely locked which corresponds to the point C where 1st gear (in the case of a gearbox with discrete gear ratios) or the minimum ratio (in the case of a constantly varying transmission) has been engaged. This is very dangerous to the driver since there is the possibility that one or even more inopportune down-shifts will be made after the wheels have locked, particularly at high speed.

The object of the present invention is therefore also to correct this shortcoming, by avoiding the down-shifts customarily brought about by the detection of the locking of the wheels, and allowing the driver to pull away again in the "right" ratio when the locking of the wheels is no longer detected. In addition to improving safety, this aspect of the invention appreciably improves the pleasure of driving, because it avoids sharp engine braking and possible loss of control when the wheels lock.

The detection of the locking of the wheels essentially relies on analysing the derivative of a characteristic variable of the rotation of the driving wheels (from a vehicle speed sensor or a torque converter turbine speed sensor) under braking.

By way of example, the principle of detecting the locking of the driving wheels is based on an analysis of the rotational speed of the driving wheels. This makes it possible to appropriately manage the gear ratios in phases when the wheels are locked, and not to down-shift through the ratios at inopportune moments, particularly at high speed. This guarantees greater driving safety, particularly on slippery ground or ground with a low adhesion, as described earlier.

Table 1 which follows represents, in terms of functions, the principle of detecting the locking of the wheels with conditions of input to the detection function, actions decided upon if locking is detected and conditions for exiting the wheel locked detection.

TABLE 1

| | FUNCTION OF DETECTING THAT THE WHEELS ARE LOCKED |
|---|---|
| Input function | Brake active and dVveh/dt < locking_threshold < 0 |
| Actions | Imposes 3rd gear if in 4th gear, otherwise stays in current gear "current gear" |
| Output conditions | C1: {if brake off and Vveh < Svv1} then {start time delay T1} |
| | C2: {if Vveh > Svv2 or if gear_selected ≧ current_gear} then start time delay T2 |
| | C3: {T1 elapsed} OR {T2 elapsed} OR {lever = P,R or N} OR {"kick-down" activated} |

Reference is made to Table 1. According to the invention, when the driver is braking and the wheels are locking, looking at the derivative of the vehicle speed makes it possible quickly to detect locking of the driving wheels, which corresponds to the condition dVveh/dt<locking_threshold<0. According to the method for detecting the locking of the wheels, the action in response to detection consists in staying in the current gear, which makes it possible not to down-shift through all the gears (possibly even as far as first gear). At the same time, the conditions C1,C2,C3 for coming out of this state of staying in gear are constantly tested.

The condition (C1) allows the condition of detecting that the wheels are locked to be left when the brake is released because in this case there can be no locking of the wheels. If, for a certain period of time T1, the speed of the vehicle remains below a threshold SVV1 (a minimum calibratable threshold for example), then this means that the vehicle is actually stationary, and detection that the wheels are locked may cease. The gear corresponding to zero speed will then be engaged.

By contrast, the condition (C2) makes it possible, for example, when the driver releases the brakes after locking the wheels, to wait until the speed returns to its "normal" operating point according to the gear change laws, and this is what is also managed by a time delay T2 (of the order of 300 to 500 ms in practice). This allows the vehicle to pull away again in the "right" transmission ratio, which improves the pleasure of driving.

The various steps in the method for detecting slippery ground according to the invention may be implemented by an automatic-transmission electronic management system which is within the competence of the person skilled in the art, particularly by adapting existing management systems. This system will not therefore be described in itself.

The condition (gear_selected≧current_gear) means that if the ratio proposed by the gear-change laws is higher than or equal to the current gear ratio, detection of the locking of the wheels may cease. Other conditions may also be taken into consideration such as, for example, in a C3, the position of the gear lever (P,R or N) or the "kick-down" lever, if the driver wishes to down-shift, which is a safety condition.

According to another feature of the method for detecting locking, in order to determine the input condition for the wheel locking phase, it is also possible to observe the variations in a variable which signifies the rotation of the torque converter turbine in addition to, or alternatively in place of the vehicle speed, provided, however, the locking threshold is dependent on the current ratio.

In short, the method according to the invention makes it possible to detect slippery ground and react to this detection by imposing on the automatic transmission operating conditions which are capable of increasing both driver safety and driving pleasure.

What is claimed is:

1. A method of detecting slippery ground for a vehicle with an automatic transmission, comprising the steps of:
   detecting an instantaneous running condition of driving wheels;
   generating a revised condition value representing a time change in the running condition of the driving wheels by
      decrementing a current wheel condition value by a first step (Δx_ΔB) each time a locking of the driving wheels is detected in the detecting step,
      decrementing the current wheel condition value by a second step (Δx_ΔE) each time a spinning of the driving wheels is detected in the detecting step, and
      incrementing the current wheel condition value by a third step (Δx_out) each time neither a locking of the driving wheels nor a spinning of the driving wheels is detected in the detecting step;
   comparing the revised condition value with a reference condition value; and
   based on the comparison of the revised condition value with the reference condition value, deciding whether or not the instantaneous running condition corresponds to a slippery ground condition.

2. The method of claim 1, wherein, after the deciding step decides that the instantaneous running condition corresponds to a slippery ground condition, the method comprises the further step of switching the vehicle's automatic transmission into a safety mode.

3. The method of claim 1, wherein, after the deciding step decides that the instantaneous running condition corresponds to a slippery ground condition, the method comprises the further step of activating an indicator alerting a driver that a safety mode has been adopted.

4. The method of claim 1, wherein, after the deciding step decides that the instantaneous running condition corresponds to a slippery ground condition, the method comprises the further step of de-activating a capability of early down-shifting during braking wherein during braking and the locking of the driving wheels there is no early down-shifting.

5. The method of claim 1, wherein, the step of detecting the instantaneous running condition of the driving wheels is performed by detecting a spinning of the driving wheels.

6. The method of claim 1, wherein, the reference condition value comprises:
   a lower threshold value (S1) and an upper threshold value (S2), and
   wherein the deciding step determines
      that the instantaneous running condition corresponds to a slippery ground condition when the revised condition value becomes greater than the lower threshold value and
      that the instantaneous running condition does not correspond to a slippery ground condition when the revised condition value becomes greater than the upper threshold value.

7. The method of claim 6, wherein, the lower and upper threshold values are variable over time and are set based on a driving style.

8. The method of claim 6, wherein, the third step (Δx_out) is set based on a driving style.

9. The method of claim 1, wherein, the step of detecting the instantaneous running condition of the driving wheels is performed by detecting a locking of the driving wheels.

10. The method of claim 9, wherein the detecting of the locking of the driving wheels comprises analyzing, under a braking condition, a derivative of a characteristic variable of a rotation of the driving wheels by the steps of
   testing whether a brake is released and whether a vehicle speed is below a first speed threshold (Svv1), starting a first time delay (T1) when the brake is released and the vehicle speed is below the first speed threshold;
   testing whether the vehicle speed is above a second threshold (Svv2) and whether a selected transmission ratio is at least equal to a current transmission ratio, starting a second time delay (T2) when the vehicle speed is above a second threshold (Svv2) or the selected transmission ratio is at least equal to the current transmission ratio;
   testing whether one of the first and second time delays have elapsed, whether the automatic transmission is in one of a P, R, and N position, and whether a kick-down is activated; and
   detecting an end of a driving wheels locked condition upon the testing steps determining any of
      the brake being released and the a vehicle speed being below the first speed threshold (Svv1),
      the vehicle speed being above the second threshold (Svv2),
      the selected transmission ratio being at least equal to the current transmission ratio,
      one of the first and second time delays having elapsed,
      the automatic transmission being in one of the P, R, and N positions, and
      the kick-down being activated,
   wherein the locking of the driving wheels is detected when, under the braking condition, the derivative is negative and below a threshold locking valve (Sb).

11. The method of claim 9, wherein the detecting of the locking of the driving wheels comprises the step of analyzing, under a braking condition, a derivative of a characteristic variable of a rotation of the driving wheels, and
   wherein the locking of the driving wheels is detected when, under the braking condition, the derivative is negative and below a threshold locking valve (Sb).

12. The method of claim 11, wherein the characteristic variable is a vehicle speed.

13. The method of claim 11, wherein the characteristic variable is a torque converter turbine speed.

14. An automatic transmission, comprising:

a detector for detecting an instantaneous running condition of driving wheels; and a processor for
  i) generating a revised condition value representing a time change in the running condition of the driving wheels by
    decrementing a current wheel condition value by a first step (Δx_ΔB) each time a locking of the driving wheels is detected in the detecting step,
    decrementing the current wheel condition value by a second step (Δx_ΔE) each time a spinning of the driving wheels is detected in the detecting step, and
    incrementing the current wheel condition value by a third step (Δx_out) each time neither a locking of the driving wheels nor a spinning of the driving wheels is detected in the detecting step,
  ii) comparing the revised condition value with a reference condition value; and
  iii) based on the comparison of the revised condition value with the reference condition value, deciding whether or not the instantaneous running condition corresponds to a slippery ground condition.

15. A motor vehicle, comprising:

an automatic gearbox with discrete gear ratios;

a detector for detecting an instantaneous running condition of driving wheels; and a processor for
  i) generating a revised condition value representing a time change in the running condition of the driving wheels by
    decrementing a current wheel condition value by a first step (Δx_ΔB) each time a locking of the driving wheels is detected in the detecting step,
    decrementing the current wheel condition value by a second step (Δx_ΔE) each time a spinning of the driving wheels is detected in the detecting step, and
    incrementing the current wheel condition value by a third step (Δx_out) each time neither a locking of the driving wheels nor a spinning of the driving wheels is detected in the detecting step,
  ii) comparing the revised condition value with a reference condition value; and
  iii) based on the comparison of the revised condition value with the reference condition value, deciding whether or not the instantaneous running condition corresponds to a slippery ground condition.

\* \* \* \* \*